US007535970B2

United States Patent
Park et al.

(10) Patent No.: US 7,535,970 B2
(45) Date of Patent: May 19, 2009

(54) WIRELESS COMMUNICATION APPARATUS AND METHOD FOR MULTIPLE TRANSMIT AND RECEIVE ANTENNA SYSTEM USING MULTIPLE CODES

(75) Inventors: Chang-Soon Park, Chungju-si (KR); Kwang-Bok Lee, Seoul (KR); Yung-Soo Kim, Seoul (KR); Jong-Hyeuk Lee, Seongnam-si (KR); Sung-Jin Kim, Suwon-si (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 555 days.

(21) Appl. No.: 10/924,463

(22) Filed: Aug. 23, 2004

(65) Prior Publication Data

US 2005/0111566 A1  May 26, 2005

Related U.S. Application Data

(60) Provisional application No. 60/603,741, filed on Aug. 23, 2004.

(30) Foreign Application Priority Data

Aug. 23, 2003  (KR) ..................... 10-2003-0058555

(51) Int. Cl.
*H04L 27/00* (2006.01)

(52) U.S. Cl. ..................... 375/267; 375/347; 375/259; 375/260; 455/132; 455/504; 455/59; 327/1; 327/100

(58) Field of Classification Search ................. 375/260, 375/267, 259; 455/132, 504, 59; 327/1, 327/100

See application file for complete search history.

(56) References Cited

U.S. PATENT DOCUMENTS

| 6,873,606 | B2 * | 3/2005 | Agrawal et al. ............. 370/310 |
| 6,930,981 | B2 * | 8/2005 | Gopalakrishnan et al. ... 370/252 |
| 2002/0159431 | A1 * | 10/2002 | Moulsley et al. ............ 370/347 |
| 2002/0160803 | A1 * | 10/2002 | Ishikawa ..................... 455/522 |
| 2003/0003863 | A1 * | 1/2003 | Thielecke et al. ............. 455/39 |

* cited by examiner

*Primary Examiner*—Shuwang Liu
*Assistant Examiner*—Helene Tayong
(74) *Attorney, Agent, or Firm*—The Farrell Law Firm, PC (57) ABSTRACT

Disclosed is a wireless communication apparatus and method for a multiple transmit and receive antenna system using multiple codes. In suggested detection algorithm, a successive interference cancellation (SIC) scheme is employed in both an antenna domain and a code domain by successively canceling multi-code interference (MCI). An effective transmit power allocation method suitable for the detection algorithm is suggested. Transmit power allocated to each code is calculated. The transmit power is determined as a simple ratio of power of a certain signal to power of a next code signal. Based on the calculated code transmit power, transmit power for each transmit antenna is allocated. Thus, information about transmit power calculated at a receive end is feedback to a transmit end through a feedback channel.

11 Claims, 5 Drawing Sheets

WIRELESS COMMUNICATION APPARATUS AND METHOD FOR MULTIPLE TRANSMIT AND RECEIVE ANTENNA SYSTEM USING MULTIPLE CODES

PRIORITY

This application claims priority to an application entitled "Wireless Communication Apparatus And Method For Multiple Transmit And Receive Antenna System Using Multiple Codes" filed in the Korean Intellectual Property Office on Aug. 23, 2003, and assigned Serial No. 2003-58555, and provisional application entitled Transmit Power Allocation For Successive Interference Cancellation In Multicode MIMO Systems, filed with the U.S. Patent and Trademark Office on Aug. 23, 2004, Ser. No. 60/603,741, the contents of each of which are hereby incorporated by reference.

BACKGROUND OF THE INVENTION

1. Field of the Invention

The present invention relates to a wireless communication apparatus and a method for a multiple transmit and receive antenna system using multiple codes, and more particularly to an apparatus and a method, which can allocate transmit power depending on transmit signals.

2. Description of the Related Art

Generally, a Bell Labs layered space-time (BLAST) system uses a multiple transmit-receive antenna. The BLAST system employs suitable signal processing at a receive end to improve spectral efficiency. In other words, a high data rate is achieved by transferring independent substreams from multiple transmit/receive antennas under a rich-scattering wireless channel environment employing channels independent of each other between transmit/receive antennas. Each transmitted signal from each transmit antenna is detected in a predetermined order according to channel conditions, and an already-detected transmitted signal is treated through a Successive Interference Cancellation (SIC) process in which a corresponding component is subtracted from a received signal when detecting the next transmitted signal. Herein, from among BLAST systems, a scheme to greater simplify signal processing by independently coding substreams is a Vertical BLAST (V-BLAST).

Meanwhile, a multi-code CDMA system has been suggested as a transmission scheme for a high and variable data rate. Herein, according to a primary notion of the multi-code CDMA system, data of a certain user are divided into several streams and transferred in parallel by allocating an orthogonal code to each stream. Accordingly, the V-BLAST system employing the multi-code CDMA transmission scheme is expected to be an important telecommunication system in a next generation mobile telecommunication, which will require a high data rate.

A reception scheme of and a performance analysis about the V-BLAST system performed until now have been deployed under a frequency-flat fading channel environment, that is, based on the assumption that a propagation delay duration is much smaller than a symbol duration. However, signals are seriously distorted under the frequency-flat fading channel environment having a propagation delay. This phenomenon is a more serious problem under a high-speed data telecommunication environment in which the symbol duration is very short. Therefore, under the frequency-selective fading channel environment, although the multi-code V-BLAST system employs orthogonal codes, an interference occurrence between codes is inevitable. Accordingly, it is necessary to remove the interference occurrence between codes.

A conventional method employs a group detection technique used in a CDMA system in order to remove correlation between codes. However, a maximum dimension of a matrix required while inverting a matrix for a group decorrelating detector through the group detection technique is equal to a number obtained after multiplying the number of antennas by the number of codes. Accordingly, as the number of used codes increases, a computation amount remarkably increases, and the group detection technique will encounter serious problems when applied to a real system.

Conventional techniques also include a technique for removing Multi-Code Interference (MCI) by using a parallel interference cancellation scheme in a multi-code system of a single transmit-receive antenna. However, since the technique has to simultaneously process received signals de-spread with respect to all codes, the technique has a problem in that hardware complexity increases in proportion to the number of codes. On the other hand, since a SIC scheme individually processes each received signal for each code in order, the SIC scheme has a relatively low hardware complexity as compared with a Parallel Interference Cancellation (PIC) scheme.

Meanwhile, according to a characteristic of a multi-code system, all transmitted signals corresponding to each code reach a receive end through the same channel. Herein, after de-spreading the transmitted signals, a receive power difference can exist due to difference between correlation values of codes. However, in the multi-code system, intensity of receive power seldom exists with respect to all codes. This is a characteristic different from an uplink multi-user CDMA environment. Generally, in the SIC scheme, a signal with the greatest strength is detected first of all, so that reliability increases. Accordingly, if the SIC scheme is employed to mitigate MCI, a process for detection ordering employed through a conventional SIC scheme will have a negligible effect. Accordingly, it is necessary to overcome performance limitations for successive MCI cancellation methods caused by the SIC scheme.

SUMMARY OF THE INVENTION

Accordingly, the present invention has been made to solve the above-mentioned problems occurring in conventional systems, and a first object of the present invention is to provide an essential technique in a next generation mobile telecommunication requiring a high data rate by suggesting an effective method for performance improvement of a multi-code V-BLAST system.

A second object of the present invention is to provide an effective detection algorithm for a multi-code V-BLAST system and a transmit power allocation method for the detection algorithm under a frequency-selective fading channel environment.

A third object of the present invention is to provide a Successive Interference Cancellation (SIC) in both a code domain and an antenna domain by using a suggested detection algorithm so as to successively perform cancellation with respect to Multi-Code Interference (MCI).

A fourth object of the present invention is to provide an effective transmit power allocation method suitable for a detection algorithm.

In order to accomplish these objects, there is provided a method for allocating transmit power in a receiver of a multi-code multiple antenna system including M transmit antennas and N receive antennas, the method employing K spreading codes to distinguish channels, the method including steps of determining a power ratio $$\left(\frac{\beta}{\eta}\right)$$

between transmit power of two spreading codes adjacent to each other from among the spreading codes by using a ratio (γ) of power of combined channel signals to power of noises and transmitting a determined power ratio (γ) to a transmitter, wherein the power ratio (γ) is proportional to the power of the combined channel signals, is inverse proportional to the power of the noises, and is determined to have a value within a range between zero and one.

There is further provided a method for allocating transmit power in a transmitter of a multi-code multiple antenna system including M transmit antennas and N receive antennas, the method employing K spreading codes to distinguish channels, the method including steps of receiving a power ratio (γ) between transmit power ($P_k$, $P_{k+1}$) to be allocated to each of two successive spreading codes, as feedback information send from a receiver and allocating the transmit power ($P_k$) according to K spreading codes by substituting the power ratio (γ) and total transmit power ($P_T$) into an equation, $$P_k = \left(\frac{1-\gamma}{1-\gamma^K} P_T\right)\gamma^{k-1}, k = 1, 2, \cdots, K.$$

There is still further provided a method for allocating transmit power in a multi-code multiple antenna system including M transmit antennas and N receive antennas, the method employing K spreading codes to distinguish channels, the method including steps of determining a power ratio (γ) such that, from among the K channels transmitted through the M transmit antennas has been measured, a signal-to-noise of each of which has been measured, a higher power is allocated to a channel with a higher signal-to-noise ratio than to a channel with a lower signal-to-nose-ratio; dividing total transmit power ($P_T$) into transmit power corresponding to each of the K channels by using the power ratio (γ); and distributing the transmit power divided according to the K channels to each of the M antennas.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

A. Overview

An effective detection algorithm for a multi-code V-BLAST system and a transmit power allocation method for the detection algorithm under a frequency-selective fading channel environment will now be described in detail. In particular, the detection algorithm suggested according to the present invention employs a method for successively canceling a Multi-Code Interference (MCI). Accordingly, a Successive Interference Cancellation (SIC) is employed in both a code domain and a space domain. An effective transmit power allocation suitable for such a detection algorithm is also described. Therefore, transmit power allocated to each code is computed using the effective transmit power allocation suitable for such a detection algorithm. Herein, the transmit power is determined as a simple ratio of power of a certain code signal to power of a next code signal. Also, transmit power is allocated to each transmit antenna based on the computed code transmit power. As described above, transmit power computed at a receive end is fed back toward a transmit end through a feedback channel.

In addition, a detection algorithm according to the present invention proposes signal processing suitable for a V-BLAST system with respect to received signals propagation-delayed by a time period as long as a chip time unit, based on an equation thoroughly reflecting all correlation between codes. In other words, a V-BLAST detection algorithm is performed by a particular antenna based on an presumption that output signals of rake fingers obtained through various multi-paths are received by additional virtual receive antennas. In other words, this is a result obtained when the multi-path diversity obtainable in a CDMA method is regarded as the virtual receive antenna diversity. Also, when detecting a transmitted signal in a code domain, a simple SIC scheme is employed to remarkably reduce the complexity of an overall system and to prevent performance deterioration due to MCI. That is, the simple SIC scheme avoids a problem of increasing hardware complexity caused by the PIC scheme and problems of increasing a computational amount caused when the conventional group de-correlating detector is employed, by constantly maintaining matrix dimension when inverting a matrix as the number of independent transmitted data corresponding to a code, that is, the number of transmit antennas regardless of increase of the number of multi-codes. The suggested algorithm employs the SIC method in a code domain, as well as in an antenna domain.

Also, an effective transmit power allocation method suitable for such a detection algorithm is suggested. To this end, transmit power allocated to each code is computed. This transmit power is determined as a simple ratio of power of a certain code signal to power of a next code signal. At this time, a greater amount of power is allocated to the first detected code signal in an order predetermined between transmit/receive ends without performing detection ordering of each code. This is performed to improve performance of the overall system, on the assumption that Signal-to-Interference-Noise Ratio (SINR) is inferior because the first detected code signal includes more interference signals, so that performance of an overall system is more degraded. Additionally, when subtracting a next detected transmit signal from a detected signal in order to perform such transmit power allocation, it is possible to effectively prevent performance degradation resulting from error propagation. These phenomena correspond to effects such as performance improvement when performing detection ordering in a conventional SIC scheme. Accordingly, as described above, performance can be effectively improved by employing a simpler transmit power allocation and omitting a complex detection ordering process in a code domain in which performance cannot be improved. Finally, transmit power allocated to each transmit/receive antenna is found based on calculated transmit power for each code. As described above, information about transmit power computed at a receive end is fed back toward a transmit end through a feedback channel.

B. System and Channel Model

Figure 1:
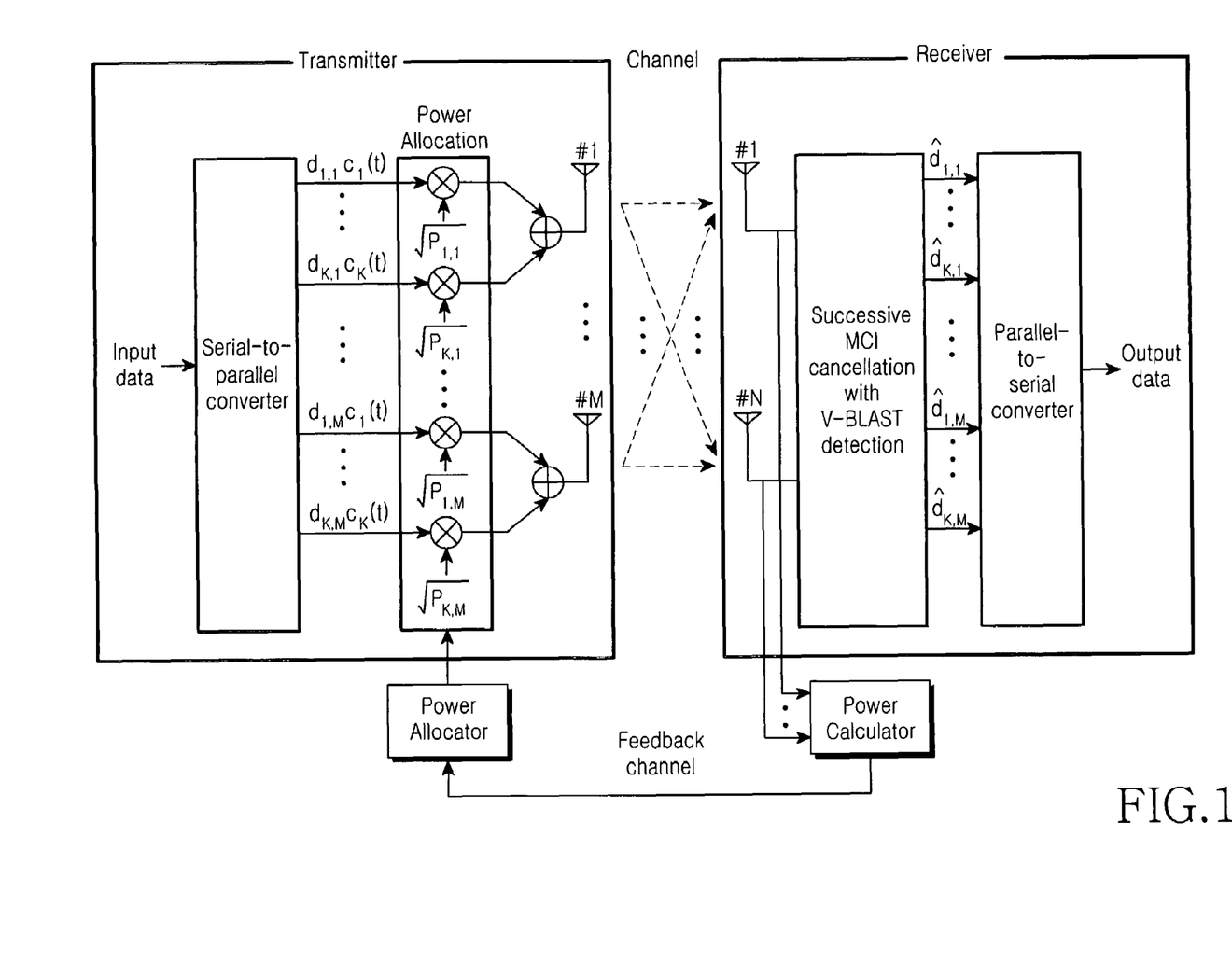
FIG. 1 is a block diagram illustrating a wireless communication system according to one embodiment of the present invention.

FIG. 1 is a block diagram illustrating a wireless communication system according to one embodiment of the present invention. In the system shown in FIG. 1, it is assumed that a multiple transmit/receive antenna system uses K spreading codes, M transmit antennas, and N receive antennas. First, a data input stream is divided into K×M parallel substreams through a serial-to-parallel converter. Each transmit antenna creates transmission signals by multiplying K substreams by mutually different spreading codes, and then by summing the resultants.

As a result, in a symbol duration, a complex base band equivalent of a transmit signal created by means of a $K^{th}$ spreading code in an $m^{th}$ transmit antenna can be represented as the following Equation 1:

$$s_m(t) = \sum_{k=1}^{K} \sqrt{P_{k,m}} \, d_{k,m} c_k(t), \quad 0 \leq t \leq T \tag{1}$$

$P_{k,m}$: transmit power for the $kth$ code at the $mth$ transmit antenna;

$d_{k,m}$: data symbol for the $kth$ code at the $mth$ transmit antenna;

$c_k(t)$: rectangular-shaped spreading waveform for the $kth$ code which takes on the values ± 1 and is defined in $0 \leq t \leq T$;

$T$: data symbol duration

M: number of total transmit antennas

In Equation 1, $C_k(t)$ is defined by the following Equation 2:

$$c_k(t) = \sum_{i=0}^{G-1} c_{k,i} \psi(t - iT_c), \quad k = 1, 2, \ldots, K \tag{2}$$

where $G=T/T_c$ is the spreading gain $T_c$ is the chip duration, $c_{k,i}$ is the $i^{th}$ chip for the $k^{th}$ code, and $\psi(t)$ is the chip pulse shape which is assumed to be rectangular, i.e. one for $0 \leq t \leq T_c$ and zero otherwise. The chip sequence $\{c_{k,i}\}$ is assumed to be a complex spreading sequence, and is given by $c_{k,i}=c_{k,i}^{(I)}+jc_{k,i}^{(Q)}$, where $\{c_{k,i}^{(I)}\}$ and $\{c_{k,i}^{(Q)}\}$ take on the random values of $+1\sqrt{2}$ and $-1\sqrt{2}$ with equal probability. Moreover, $\{c_{k,i}\}$ are mutually orthogonal for all k, i.e.

$$\sum_{i=0}^{G-1} c_{k_1,i} c_{k_2,i}^* = 0 \text{ for } k_1 \neq k_2,$$

where the superscript * denotes the complex conjugate.

Also, a summation of transmit power of all transmit antennas corresponding to $k^{th}$ code is called $P_k$, and a summation of transmit power for all codes is represented as $P_t$. That is, the $P_k$ and $P_t$ are represented as $$\sum_{m=1}^{M} P_{k,m} = P_k \text{ and } \sum_{k=1}^{K} P_k = P_T,$$

respectively.

It is assumed that a channel model between a specific transmit antenna and a specific receive antenna is a frequency-selective Rayleigh fading channel. Based on a tapped delay line multi-path channel model, a complex channel impulse response from an $m^{th}$ transmit antenna to a $p^{th}$ receive antenna can be represented as the following Equation 3:

$$h_{p,m}(t) = \sum_{l=0}^{L-1} h_{p,m,l} \delta(t - lT_c) \tag{3}$$

where L corresponds to the number of resolvable multi-path components and $T_c$ refers to a chip duration of a spreading code. All $h_{p,m,l}$s are assumed to be Gaussian random variables with zero mean, which are identically distributed and independent for all p, and m. Also, the $h_{p,m,l}$ is assumed to be independent for all ls and be determined according to an exponential multi-path intensity profile. In other words, the $h_{p,m,l}$ is determined through an equation $$\Omega_l = E[|h_{p,m,l}|^2] = \Omega_0 e^{-l\delta}$$

where l is defined by 0, 1, l-1, E[·] denotes the expectation and the parameter δ represents the rate of the exponential decay of the average path power. Meanwhile, it is assumed that a multi-path delay spread is much smaller than the symbol duration, so that an effect of the intersymbol interference is negligible. It is assumed that channel information is not varied during a symbol duration. Also, it is assumed that a receive end exactly measures and knows the channel information required for the detection algorithm.

At this time, a signal received in a $p^{th}$ receive antenna can be represented as the following Equation 4:

$$r_p(t) = \sum_{m=1}^{M} \sum_{l=0}^{L-1} h_{p,m,l} s_m(t - lT_c) + w_p(t) \tag{4}$$

$$= \sum_{k=1}^{K} \sum_{m=1}^{M} \sum_{l=0}^{L-1} \sqrt{P_{k,m}} h_{p,m,l} d_{k,m} c_k(t - lT_c) + w_p(t), \quad p = 1, 2, \ldots, N,$$

where $w_p(t)$ corresponds to the additive white Gaussian noise (AWGN) with zero mean at the $p^{th}$ receive antenna with one-sided power spectral density $\sigma^2$.

Such signals received at each receive antenna are processed through the suggested successive MCI cancellation method with V-BLAST detection. As a result, transmitted data are estimated.

C. Detection Process

Hereinafter, a successive MCI cancellation scheme for a multi-code V-BLAST system will be described. To this end, an output signal of a correlator bank for a specific code is represented as an equation without the successive MCI cancellation, which provides the basis for the below description about a detection algorithm for the successive MCI cancellation.

It is assumed that each receive antenna has a rake receiver structure for detecting a received signal corresponding to each multi-path. At this time, in order to detect substreams corresponding to $k_0^{th}$, on the assumption that each receive antenna allows a received signal to pass a correlator bank corresponding to $k_0^{th}$, a complex baseband received signal corresponding to an output of the correlator bank is calculated. For the calculation, a correlator output corresponding to a $k_0^{th}$ code at an $l^{th}$ rake finger of a $p^{th}$ receive antenna is represented as $z_{k_0,p,l}$, and defined by the following Equation 5:

$$z_{k_0,p,l} = \int_{lT_c}^{T+lT_c} r_p(t) c_{k_0}^*(t - lT_c) dt, \; k_0 = 1, 2, \qquad (5)$$

$$\ldots, K, \; p = 1, 2, \ldots, N, \; l = 0, 1, \ldots, L-1$$

Also, correlation between two predetermined codes having a discordance of a time difference of $lT_c$ from each other is defined by the following Equation 6:

$$R_{k_0,k}(l) = \int_{-\infty}^{\infty} c_{k_0}(t) c_k(t - lT_c) dt \qquad (6)$$

At this time, when defining and expressing all correlator outputs for $k_0^{th}$ codes as an $NL \times 1$ column vector, the following Equation 7 is found:

$$z_{k_0} \square [z_{k_0,1,0}, z_{k_0,1,1}, \ldots, z_{k_0,1,L-1}, z_{k_0,2,0}, \ldots, z_{k_0,N,L-1}]^T = \qquad (7)$$

$$Y_{k_0,k_0} P_{k_0} d_{k_0} + \sum_{k=1, k \neq k_0}^{K} Y_{k_0,k} P_k d_k + n_{k_0}$$

where the superscript $[\cdot]^T$ denotes the transpose. $Y_{k_0,k} = [Y_{k_0,k,1}^T, Y_{k_0,k,2}^T, \ldots, Y_{k_0,k,N}^T]^T$ represents the $NL \times M$ space-time code correlation matrix, where $Y_{k_0,k,p}$ (p=1, 2, L, N) is the $L \times M$ matrix whose element in the ith row and jth column, $(Y_{k_0,k,p})_{i,j}$, is $$\sum_{l=0}^{L-1} h_{p,j,l} R_{k_0,k}(l - (i-1)).$$

Herein, each parameter used for equation 7 is defined in Equation 8 to Equation 12, provided below.

$$Y_{k_0,k,p} = \sum_{l=0}^{L-1} \begin{bmatrix} h_{p,1,l} R_{k_0,k}(l) & h_{p,2,l} R_{k_0,k}(l) & \ldots & h_{p,M,l} R_{k_0,k}(l) \\ h_{p,1,l} R_{k_0,k}(l-1) & h_{p,2,l} R_{k_0,k}(l-1) & \ldots & h_{p,M,l} R_{k_0,k}(l-1) \\ \vdots & \vdots & \ddots & \vdots \\ h_{p,1,l} R_{k_0,k}(l-(L-1)) & h_{p,2,l} R_{k_0,k}(l-(L-1)) & \ldots & h_{p,M,l} R_{k_0,k}(l-(L-1)) \end{bmatrix} \qquad (8)$$

Equation 9:

$$(Y_{k_0,k,p})_{i,j} = \sum_{l=0}^{L-1} h_{p,j,l} R_{k_0,k}(l - (i-1)), \qquad (9)$$

$$i = 1, 2, \ldots, L, \; j = 1, 2, \ldots, M$$

Equation 10:

$$P_{k_0} = diag(\sqrt{P_{k_0,1}}, \sqrt{P_{k_0,2}}, \ldots, \sqrt{P_{k_0,M}}). \qquad (10)$$

Equation 11:

$$d_{k_0} = [d_{k_0,1}, d_{k_0,2}, \ldots, d_{k_0,M}]^T, \qquad (11)$$

Equation 12:

$$n_{k_0} = [n_{k_0,1} \ldots]^T. \qquad (12)$$

A symbol $(.)_{ij}$ among symbols described above represents an element of an $i_{th}$ column and a $j_{th}$ row, and a predetermined element $n_{k_0,p}$ of an $NL \times 1$ Gaussian noise vector, $n_{k0}$, is defined by Equation 13:

$$n_{k_0,p,l} \square \int_{lT_c}^{T+lT_c} w_p(t) c_{k_0}(t - lT_c) dt \qquad (13)$$

Accordingly, a covariance matrix of a noise vector, $n_{k0}$, can be found through the following Equation 14:

$$n_{k_0,p,l} \square \int_{lT_c}^{T+lT_c} w_p(t) c_{k_0}(t - lT_c) dt \qquad (14)$$

The superscript $[\cdot]^H$ from among subscripts used for Equation 14 denotes the conjugate transpose. An L×L matrix $\tilde{R}_{k_0}$ is a correlation matrix of a spreading waveform vector corresponding to a $k_0^{th}$ code and defined by Equation 15.

$$\tilde{R}_{k_0} = \int_{-\infty}^{\infty} c_{k_0}(t)(c_{k_0}(t))^T dt \tag{15}$$

where the $c_{k_0}(t)$ represents or refers to a signal vector in which a spreading waveform having components each corresponding to the $k_0^{th}$ code has been delayed by a chip duration, and is defined by $c_{k_0}(t) \square [c_{k_0}(t), c_{k_0}(t-T_c), \ldots, c_{k_0}(t-(L-1)T_c)]^T$. Also, it is noted that $(\tilde{R}_{k_0})_{i,j} = R_{k_0,k_0}(|i-j|)$ is obtained from Equation 6 and Equation 15.

In Equation 7, the $Y_{k_0,k_0}P_{k_0}d_{k_0}$ component is a desired signal part for the data vector $d_{k_0}$ and the $$\sum_{k=1, k \neq k_0}^{K} Y_{k_0,k} P_k d_k + n_{k_0}$$

component corresponds to a summation of an MCI component and a Gaussian noise component. Herein, a covariance matrix for the $$\sum_{k=1, k \neq k_0}^{K} Y_{k_0,k} P_k d_k + n_{k_0}$$

is found by means of Equation 16.

$$E\left[\left(\sum_{k=1,k \neq k_0}^{K} Y_{k_0,k} P_k d_k + n_{k_0}\right)\left(\sum_{k'=1,k' \neq k_0}^{K} Y_{k_0,k'} P_{k'} d_{k'} + n_{k_0}\right)^H\right] = \tag{16}$$

$$\sum_{k=1, k \neq k_0}^{K} E[Y_{k_0,k} P_k (Y_{k_0,k} P_k)^H] + R_{k_0}^{noise}.$$

When solving equation 16, an equation $$E[d_k d_{k'}^H] = \begin{cases} I_{M \times M}, & \text{if } k = k' \\ O_{M \times M}, & \text{if } k \neq k' \end{cases}$$

is used, in which subscripts $I_{M \times M}$ and $O_{M \times M}$ represents an M×M identity matrix and an M×M null matrix, respectively. According to a result of the Equation 16, elements of the $Y_{k_0,k}$ matrix, which is required for finding the covariance matrix due to MCI, include channels and all correlations between spreading codes for different users. Although the spreading codes can be found, the channels are given, and the correlations between the spreading codes are calculated as mean values in order to more simply calculate the correlations.

Expectations of the correlations are found through the following Equation 17:

$$E[R_{k_0,k}(i) R_{k_0,k}(j)] = \begin{cases} (G-|i|)T_c^2, & k_0 \neq k, i = j \neq 0 \\ G^2 T_c^2, & k_0 = k, i = j = 0 \\ (G-|i|)T_c^2, & k_0 = k, i = \pm j \neq 0 \\ 0, & \text{else} \end{cases} \tag{17}$$

where the G refers to a spreading factor $T/T_c$. By using the expectations, an element $(R_k^{MCI})_{i',j'}$ corresponding to an (i'=L (p−1)+i)$^{th}$ column and a (j'=L(q−1)+j)$^{th}$ row of the matrix $R_k^{MCI} = E[Y_{k_0,k} P_k (Y_{k_0,k} P_k)^H]$ is found by means of Equation 18:

$$(R_k^{MCI})_{i',j'} = E\left[\sum_{m=1}^{M} P_{k,m}\left(\sum_{l=0}^{L-1} h_{p,m,l} R_{k_0,k}(l-(i-1)) \sum_{l'=0}^{L-1} h_{q,m,l'}^* R_{k_0,k}(l'-(j-1))\right)\right] \tag{18}$$

$$= \begin{cases} \sum_{m=1}^{M} P_{k,m} \sum_{\substack{l=i-j \\ l \neq i-1}}^{L-1} h_{p,m,l} h_{q,m,l-(i-j)}^* (G-|l-(i-1)|)T_c^2, & i \geq j \\ \sum_{m=1}^{M} P_{k,m} \sum_{\substack{l=j-i \\ l \neq j-1}}^{L-1} h_{p,m,l-(j-i)} h_{q,m,l}^* (G-|l-(j-1)|)T_c^2, & j > i \end{cases}, k_0 \neq k$$

$$p, q = 1, 2, \ldots, N, i, j = 1, 2, \ldots, L$$

Figure 2:
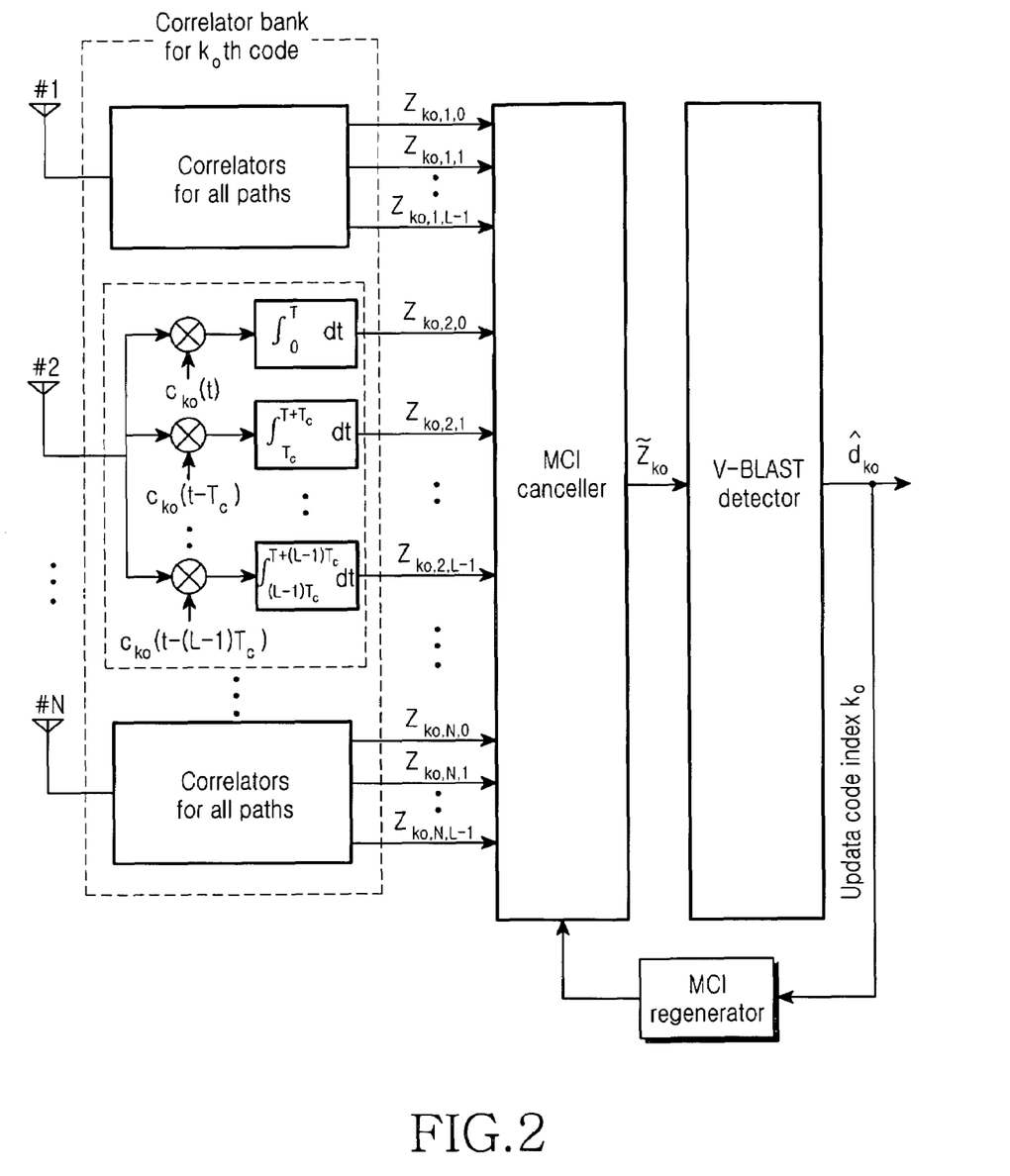
FIG. 2 is a detailed block diagram illustrating a successive MCI cancellation with V-BLAST detection part of a receiver structure shown in FIG. 1.
Figure 3:
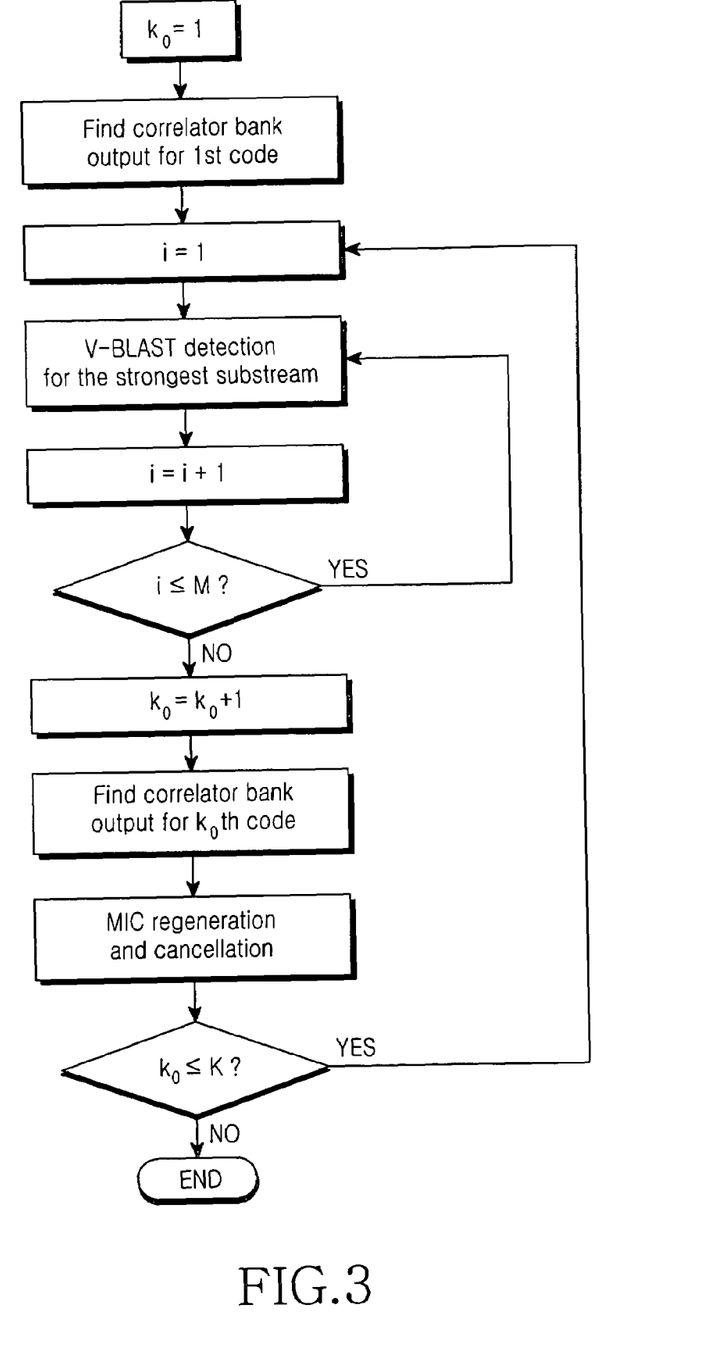
FIG. 3 is a flowchart showing a signal processing procedure.

Hereinafter, a successive MCI cancellation scheme for a multi-code V-BLAST system will be described on the basis of equations described above. Herein, a linear weighting vector employs a Zero-Forcing (ZF) scheme. FIG. 2 is a detailed block diagram illustrating a successive MCI cancellation with V-BLAST detection part of a receiver structure, and FIG. 3 is a flowchart showing the signal processing procedure.

Step 1) Initialization for CD-SIC (Code Domain SIC):

$k_0 = 1$ $$\bar{z}_1 = z_1 = Y_{1,1} P_1 d_1 + \sum_{k=2}^{K} Y_{1,k} P_k d_k + n_1$$

Step 2) Initialization for SD-SIC (Space Domain SIC):

$i = 1$ $z\%_{k_0}(1) = z\%_{k_0}$ $G_{k_0}(1) = (Y_{0,k_0})^+$ $$g(1) = \underset{j}{\operatorname{argmin}} \left( G_{k_0}(1) \left( \sum_{k=k_0+1}^{K} R_{k_0,k}^{MCI} + R_{k_0}^{noise} \right) (G_{k_0}(1))^H \right)_{j,j}$$

Step 3) SD-SIC for the g(i)th substream of the k0th code:

$w_{k_0, g(i)} = [G_{k_0}(i)]_{g(i)}$ $\hat{d}_{k_0, g(i)} = Q(w_{k_0, g(i)} z\%_{k_0}(i))$ $z\%_{k_0}(i+1) = z\%_{k_0}(i) - \sqrt{P_{k_0, g(i)}} \hat{d}_{k_0, g(i)} <Y_{k_0,k_0}>_{g(i)}$, $i < M$ $G_{k_0}(i+1) = (<Y_{k_0,k_0}>_{\overline{g(i)}})^+$, $i < M$ $$g(i+1) = \underset{j \notin \{g(1), \ldots, g(i)\}}{\operatorname{argmin}} \left( G_{k_0}(i+1) \left( \sum_{k=k_0+1}^{K} R_{k_0,k}^{MCI} + R_{k_0}^{noise} \right) (G_{k_0}(i+1))^H \right)_{j,j},$$

$i < M$

Step 4) Repetition or termination for SD-SIC:
If i<M, increase i by one and go to Step 3.
Otherwise, go to Step 5.

Step 5) CD-SIC for the substreams of the $(k_0+1)^{th}$ code:

$$\bar{z}_{k_0+1} = Y_{k_0+1,k_0+1} P_{k_0+1} d_{k_0+1} + \sum_{k=1, k \neq k_0+1}^{K} Y_{k_0+1,k} P_k d_k - \sum_{k=1}^{k_0} Y_{k_0+1,k} P_k \hat{d}_k + n_{k_0+1}, k_0 < K$$

Step 6) Repetition or termination for CD-SIC:
If $k_0 < K$, increase $k_0$ by one and go to Step 2.
Otherwise, terminate the detection procedure. Herein, the subscripts $(.)_+$, $[.]_i$, $<.>_i$, and $<.>_{\overline{g(i)}}$ represent Moore-Penrose pseudo-inverse, an $i^{th}$ column of a given matrix, an $i^{th}$ row of the given matrix, and the deflated version of the given matrix, in which columns $g(1), g(2), \cdots, g(i)$ have been subtracted. The subscript Q(.) denotes a quantization (slicing) operation corresponding to the modulation scheme.

Through the algorithm, step 2) and step 4), which can be called an inner loop, are processes repeated in order to detect data symbols employing identical codes, and are similar to a detection algorithm of a conventional narrowband V-BLAST system. However, the number of columns of the matrix $Y_{k_0,k_0}$, which is used for calculating pseudo-inverse increases up to the number of multi-paths, and a matrix exactly using all correlations between spreading codes is employed. Also, the inner loop computes SINR based on MCI when processing detection ordering.

In the meantime, step 1) and step 4), which are called an outer loop, are repeated whenever all data symbols corresponding to each spreading code are detected through the V-BLAST algorithm. The outer loop computes output signals of the correlator bank corresponding to new spreading codes. The outer loop reproduces MCI of data symbols of already-detected spreading codes to subtract the MCI.

D. Transmit Power Allocation

Figure 4:
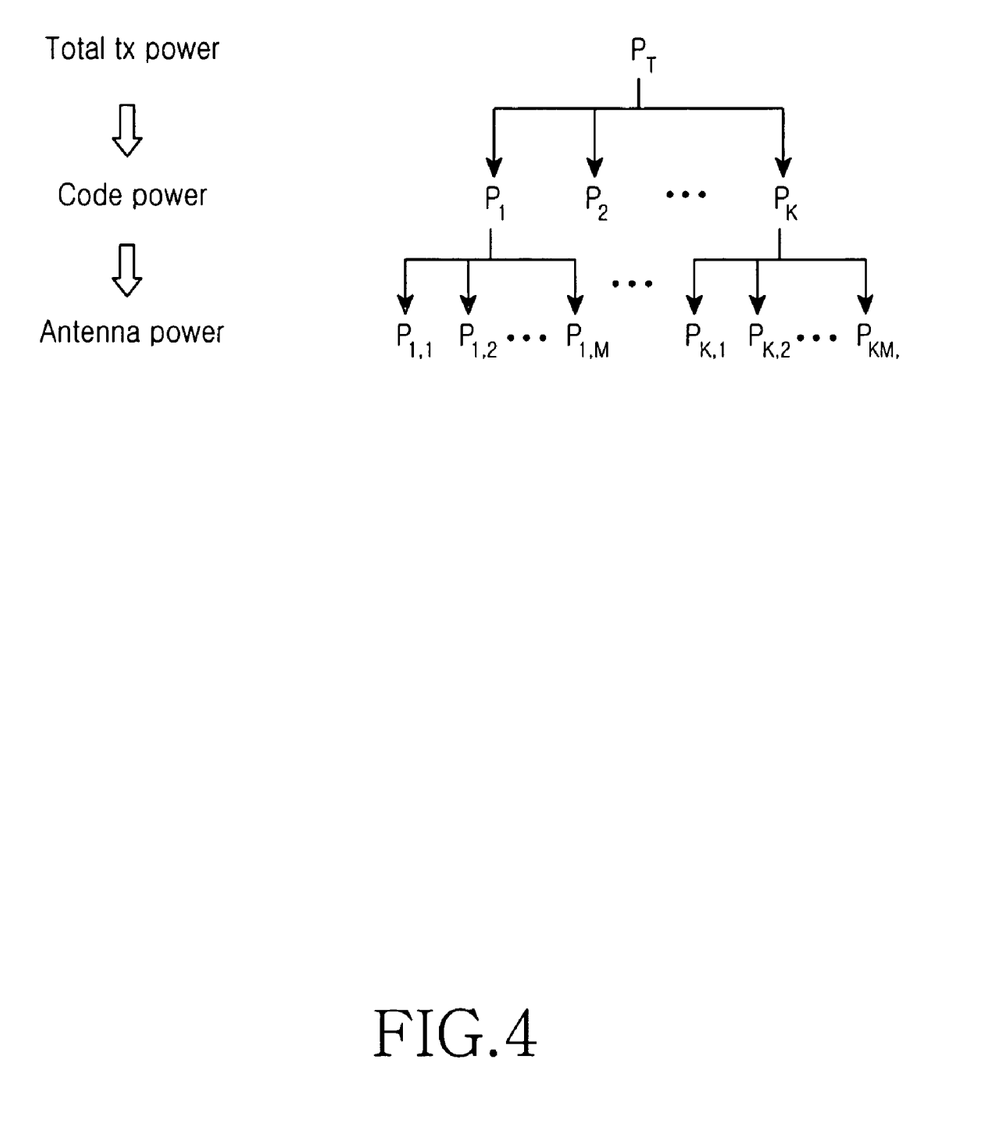
FIG. 4 illustrates an overall structure for transmit power allocation.

Hereinafter, based on the above-described successive MCI cancellation algorithm, a transmit power allocation scheme for the successive MCI cancellation algorithm will be described. First, all transmit power, that is, all code transmit power for all transmit signals employing identical codes is allocated. Based on the allocated transmit power, transmit power of a variety of antennas corresponding to each code, that is, transmit power of each antenna is allocated. FIG. 4 illustrates an overall structure for transmit power allocation. Such information about each transmit power is calculated at a receive end, and then is fed back to a transmit end. When describing a transmit power allocation method, it is assumed that error propagation due to already detected signals does not exist.

Hereinafter, two methods for allocating code transmit power, i.e. Scheme A and Scheme B, are describes below:

Scheme A

In Scheme A, when calculating a code SINR, a channel is given, and a mean value of code values is calculated. Also, each code transmit power is determined such that the following equations are satisfied. Herein, when allocating code transmit power, it is assumed that all symbols of each transmit antenna corresponding to a specific code have identical transmit power. That is, it is assumed that an equation $P_{k,m} = P_k/M$ is achieved for all ks and ms.

The following Equation 19 defines the SINR in a code domain for a $k_0^{th}$ code Equation 19:

$$\Gamma_{k_0}^{CD} \Box \frac{E[\|Y_{k_0,k_0} P_{k_0} d_{k_0}\|^2]}{E\left[\left\|\sum_{k=k_0+1}^{K} Y_{k_0,k} P_k d_k + n_{k_0}\right\|^2\right]}, k_0 = 1, 2, \ldots, K \quad (19)$$

where $\|\cdot\|$ denotes the Euclidean norm of a vector, and the squared norms are averaged over the spreading sequences as well as the data symbols and the additive noise. $Y_{k_0,k_0} P_{k_0} d_{k_0}$ in Equation 19 is the desired signal vector and $$\sum_{k=k_0+1}^{K} Y_{k_0,k} P_k d_k + n_{k_0}$$

in Equation 19 is the MCI-plus-noise vector with the error propagation ignored. Note that the elements of these vectors are the signals posterior to the CD-SIC detection process and prior to the SD-SIC detection process. Based on the equal code domain SINR design, we allocate the code power so that code domain SINR $\Gamma_{k_0}^{CD}$ becomes equal for all codes as described in Equation 20:

$$\Gamma_{k_0}^{CD} = \frac{E[\|Y_{k_0,k_0} P_{k_0} d_{k_0}\|^2]}{E\left[\left\|\sum_{k=k_0+1}^{K} Y_{k_0,k} P_k d_k + n_{k_0}\right\|^2\right]} \Gamma^{CD}, k_0 = 1, 2, \ldots, K \quad (20)$$

To find the code power set that satisfy Equation 20, we assume that all space domain power components for each code have the same values, i.e. $P_{k,m}=P_k/M$ for all k and m. Using Equation 17, it can be shown that Equation 20 is reduced to Equations 21-24:

$$\frac{\alpha P_{k_0}}{\beta \sum_{k=k_0+1}^{K} P_k + \eta} = \Gamma^{CD}, k_0 = 1, 2, \ldots, K \quad (21)$$

where $$\alpha = \frac{1}{M} \sum_{p=1}^{N} \sum_{i=1}^{L} \sum_{m=1}^{M} \left( |h_{p,m,(i-1)}|^2 G^2 T_c^2 + \sum_{\substack{l=0 \\ l \neq i-1}}^{L-1} |h_{p,m,l}|^2 (G - |l - (i-1)|) T_c^2 \right) \quad (22)$$

$$\beta = \frac{1}{M} \sum_{p=1}^{N} \sum_{i=1}^{L} \sum_{m=1}^{M} \sum_{\substack{l=0 \\ l \neq i-1}}^{L-1} |h_{p,m,l}|^2 (G - |l - (i-1)|) T_c^2 \quad (23)$$

$$\eta = NL\sigma^2 T. \quad (24)$$

Solving K+1 simultaneous equations in Equation 21 as derived in Transmit Power Allocation For Successive Interference Cancellation In Multicode MIMO Systems, filed with the U.S. Patent and Trademark Office on Aug. 23, 2004, as provisional application Ser. No. 60/603,741, we can find the code power values as $$P_k = \left(\frac{1-\gamma}{1-\gamma^K} P_T\right) \gamma^{k-1}, k = 1, 2, \ldots, K \quad (25)$$

where $$\gamma = 1 / \left(1 + P_T \frac{\beta}{\eta}\right)^{1/K}. \quad (26)$$

Using Equation 23 and Equation 24, $\beta/\eta$ in Equation 26 provides Equation 27, calculated as:

$$\frac{\beta}{\eta} = \frac{T_c^2}{MNL\sigma^2 T} \sum_{p=1}^{N} \sum_{i=1}^{L} \sum_{m=1}^{M} \sum_{\substack{l=0 \\ l \neq i-1}}^{L-1} |h_{p,m,l}|^2 (G - |l - (i-1)|). \quad (27)$$

If we assume that G>>L, Equation 28 may be approximated as:

$$\frac{\beta}{\eta} \cong \frac{T_c^2 G(L-1)}{MNL\sigma^2 T} \sum_{p=1}^{N} \sum_{m=1}^{M} \sum_{l=0}^{L-1} |h_{p,m,l}|^2 \Box \rho. \quad (28)$$

Note that γ in Equation 26 is the power ratio between the two adjacent code powers, i.e. $\gamma=P_{k+1}/P_k$ for k=1, 2, . . . , K−1.

From Equation 25, it can be seen that the code power values are determined by the total given transmit power $P_T$ and the power ratio γ.

Scheme B

In scheme B, a mean value for both codes and channels is found when calculating a code SINR. Similarly, when β, and η corresponding to Scheme B are called $\beta_B$ and $\eta_B$, the $\beta_B$ and $\eta_B$ are found by using Equation 29:

$$\frac{\beta_B}{\eta_B} \cong \frac{T(L-1)}{GL\sigma^2} \Omega_{sum} \Box \rho, \text{ where } \Omega_{sum} = \sum_{l=0}^{L-1} \Omega_l = \sum_{l=0}^{L-1} E[|h_{p,m,l}|^2] \quad (29)$$

In Equation 29, when MN approaches ∞, that is, MN→∞, ρ h approaches to ρ, that is, ρ h→ρ. Accordingly, when the number of transmit/receive antenna increases, code power ratios found through Scheme A and Scheme B are approximately similar value to each other. Also, in Scheme B, the code power ratio relates to only average power and not instantaneous power of a channel gain. Therefore, when this value is constant and can be exactly measured at the receive end, it is enough to perform only one feedback to the transmit end from the receive end.

Meanwhile, transmit power allocated for each transmit antenna is founded based on the above-found transmit power allocated for each code. In other words, transmit power $P_k$ of all transmit antennas corresponding to one code is found by using an earlier found value. Also, transmit power $P_k$, m of each transmit antenna is allocated through the V-BLAST algorithm such that post-detection SINR, which is obtained after estimating transmit antenna symbols, is identical to all transmit antennas. When representing a post-detection SINR for an $m^{th}$ transmit antenna of a $k_0^{th}$ code with an assumption that $\beta_{k_g,m}$ is power for MCI, and $\eta_{k,m}$ is a Gaussian noise, the post-detection SINR is represented as $$\frac{P_{k_0,m}}{\bar{\beta}_{k_0,m} + \tilde{\eta}_{k_0,m}}.$$

Accordingly, transmit power of each transmit antenna of $k_0^{th}$ code is allocated such that the following Equation 30 is satisfied:

$$\frac{P_{k_0,m}}{\bar{\beta}_{k_0,m} + \tilde{\eta}_{k_0,m}} = \tilde{\Gamma}_{k_0}, \text{ for all } k_0 \text{ and } m\left(\sum_{m=1}^{M} P_{k_0,m} = P_{k_0}\right) \quad (30)$$

An algorithm for solving Equation 30 is as follows:

Step 0) Initialization for outer loop:

$$k_0 = K \quad (31a)$$

Step 1) Initialization for inner loop:

$$i = 1 \quad (31b)$$

$$G_{k_0}(1) = (Y_{k_0,k_0})^+ \quad (31c)$$

Step 2) Calculation of $\beta\%_{k_0,g(i)}$ and $\eta\%_{k_0,g(i)}$ for the g(i)th substream of the $k_0$th code:

$$g(i) = \underset{j \notin \{g(1), \ldots, g(i-1)\}}{\operatorname{argmin}} \left( G_{k_0}(i) \left( \sum_{k=k_0+1}^{K} R_{k_0,k}^{MCI} + R_{k_0}^{noise} \right) (G_{k_0}(i))^H \right)_{j,j} \quad (31d)$$

$$w_{k_0,g(i)} = [G_{k_0}(i)]_{g(i)} \quad (31e)$$

$$\bar{\beta}_{k_0,g(i)} = w_{k_0,g(i)} \left( \sum_{k=k_0+1}^{K} R_{k_0,k}^{MCI} \right) w_{k_0,g(i)}^H \quad (31f)$$

$$\eta\%_{k_0,g(i)} = w_{k_0,g(i)} R_{k_0}^{noise} w_{k_0,g(i)}^H \quad (31g)$$

$$G_{k_0}(i+1) = (<Y_{k_0,k_0}>_{\overline{g(i)}})^+ \quad (31h)$$

Step 3) Repetition or termination for inner loop:
Increase i by one and go to Step 2 if i≦M.

Otherwise, go to Step 4.

Step 4) Calculation of transmit antenna power for the $k_0$th code:

$$P_{k_0,m} = (\bar{\beta}_{k_0,m} + \tilde{\eta}_{k_0,m}) \frac{P_{k_0}}{\sum_{m=1}^{M} (\bar{\beta}_{k_0,m} + \tilde{\eta}_{k_0,m})}, \quad (31i)$$

$$k_0 = 1, 2, \ldots, K, m = 1, 2, \ldots, M$$

Step 5) Repetition or termination for outer loop:
Decrease $k_0$ by one and go to Step 1 if $k_0 \geq 1$.
Otherwise, terminate the whole antenna power allocation algorithm.

It should be noted that all final values for the nulling vector and detection ordering, calculated in the power allocation procedure, can be used in the detection procedure described without repeating calculations.

Figure 5:
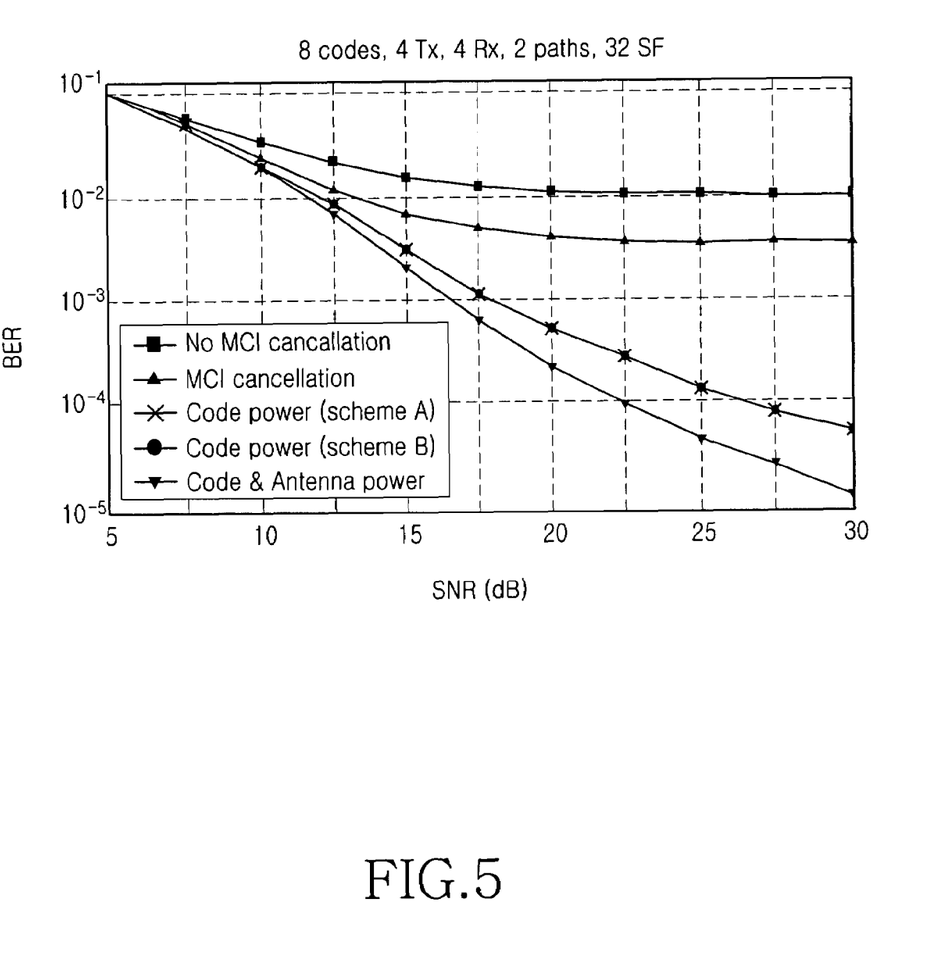
FIG. 5 is a graph showing an example simulation result according to one embodiment of the present invention.

FIG. 5 is a graph showing an example simulation result according to one embodiment of the present invention. Through the simulation, QPSK is employed as a modulation scheme, and an exponential decay rate σ of each path power of a channel has a value of 0.5. Also, variance of each path gain is normalized by using $\Omega_{sum}$ having a value of one ('1'). For spreading codes, orthogonal Walsh-Hadamard codes multiplied by common scrambling codes are used. As scrambling codes, random binary codes are used. Among results of the simulation, SNR is defined by $P_T/\sigma^2$, where P is equal to $P_T/K$.

FIG. 5 illustrates BER performance comparison when K, M, N, L, and G are equal to '8', '4', '4', '2', and '32', respectively. When employing the successive MCI cancellation scheme, BER performance is much more improved as compared with a case in which the successive MCI cancellation scheme is not employed.

Differently from a case of employing only the successive MCI cancellation scheme, when employing a code power allocation scheme, the BER performance is continuously improved and is not saturated as the SNR increases. Additionally, Scheme A and Scheme B, which are methods for allocating code power, have approximately identical performance. As described above, this is derived from the fact that code power ratios through Scheme A and Scheme B are approximately equal to each other when employing multiple transmit/receive antennas. When additionally allocating transmit power of an antenna, the BER performance is further improved. However, when the addition transmit power allocation is compared with a previous code transmit power allocation in view of performance improvement, their difference in view of BER performance improvement is small.

As described above, according to the present invention, a simple and effective detection algorithm is suggested by employing an SIC scheme in both an antenna domain and a code domain in order to improve performance of a multi-code V-BLAST system under a frequency-selective fading channel environment. Since the SIC scheme has low hardware complexity and superior performance as compared with a PIC scheme, the present invention has an advantage in view of a system embodiment. Also, according to the present invention, a computation amount can be remarkably reduced as compared with a conventional technique using a group decorrelating detector.

Additionally, according to the present invention, an effective transmit power allocation method is suggested based on a multi-code system characteristic in which all transmitted signals corresponding to each code reach a receive end through the same channel. That is, when a complex detection ordering process used for a typical SIC scheme is employed in a code domain, the detection ordering process seldom improves performance. Therefore, the detection ordering process is replaced with a code transmit power allocation scheme, so that the code transmit power allocation scheme achieves performance improvement. Herein, owing to the above-described multi-code system characteristic, transmit power of codes is determined only by finding a ratio of power of a certain code signal to power of a next code signal. Accordingly, a computation amount is reduced by omitting the complex detection ordering process, and an information amount for feedback is remarkably reduced because only one ratio value is fed back to a transmit end when code transmit power information is fed back to a receive end from the transmit end. In particular, when employing a multi-antenna system having a great number of antennas, although a constant ratio value found by measuring average power of a channel gain is employed, approximately identical performance is achieved. Accordingly, when average power of the channel gain is constant, and the average power is exactly measured, although the magnitude of an instantaneous channel gain is frequently varied depending on time, the code transmit power allocation is sufficiently achieved by performing only one feedback to the transmit end from the receive end.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A method for allocating transmit power in a receiver of a multi-code multiple antenna system including M transmit antennas and N receive antennas, the method employing K spreading codes to distinguish channels, the method comprising the steps of:

determining a power ratio ($\gamma$) between transmit power of two adjacent spreading codes by using a ratio $$\left(\frac{\beta}{\eta}\right),$$

which denotes a ratio of power of combined channel signals to noise power; and transmitting the determined power ratio ($\gamma$) to a transmitter, wherein the ratio ($\gamma$) is proportional to the power of the combined channel signals, is inverse proportional to the noise power, is determined to have a value within a range between '0' and '1', and is determined by an equation $$\gamma = 1 \Big/ \left(1 + P_T \frac{\beta}{\eta}\right)^{1/K},$$

wherein $P_T$ denotes total given transmit power and k denotes a number of total channels.

2. The method as claimed in claim 1, wherein when G is approximate to L, $$\frac{\beta}{\eta}$$

is approximated by equation $$\frac{\beta}{\eta} \cong \frac{T_c^2 G(L-1)}{MNL\sigma^2 T} \sum_{p=1}^{N} \sum_{m=1}^{M} \sum_{l=0}^{L-1} |h_{p,m,l}|^2 = \rho$$

wherein the $T_c$ denotes chip duration, $h_{p,m,l}$ denotes independent and identically distributed zero-mean complex Gaussian random variables, G denotes spreading factor $T/T_c$, T denotes data symbol duration, L denotes a number of resolvable multi-path components, M denotes a number of total transmit antennas, N denotes a number of total receive antennas, p denotes a receive antenna index, and m denotes a transmit antenna index.

3. The method as claimed in claim 1, wherein, in finding a signal-to-noise ratio according to the spreading codes by calculating mean power values of all channels, $$\frac{\beta}{\eta}$$

is found by using equation $$\frac{\beta}{\eta} \cong \frac{T(L-1)}{GL\sigma^2} \Omega_{sum} \rho_c, \text{ where } \Omega_{sum} = \sum_{l=0}^{L-1} \Omega_l = \sum_{l=0}^{L-1} E\big[|h_{p,m,l}|^2\big],$$

wherein all $|h_{p,m,l}|^2$ for a particular path index l are assumed to be independent and identically distributed random variables with finite mean $\Omega_l$ for all p and m.

4. A method for allocating transmit power in a transmitter of a multi-code multiple antenna system including M transmit antennas and N receive antennas, the method employing K spreading codes to distinguish channels, the method comprising the steps of:

receiving a power ratio ($\gamma$) between transmit powers ($P_k$, $P_{k+1}$) to be allocated to each of two successive spreading codes, as feedback information sent from a receiver; and allocating the transmit power ($P_k$) according to K spreading codes by substituting the power ratio ($\gamma$) and total transmit power ($P_T$) into equation $$P_k = \left(\frac{1-\gamma}{1-\gamma^K} P_T\right) \gamma^{k-1}, \quad k = 1, 2, \cdots, K,$$

and $$\gamma = 1 \Big/ \left(1 + P_T \frac{\beta}{\eta}\right)^{1/K},$$

wherein $P_T$ denotes total given transmit power, $$\frac{\beta}{\eta}$$

denotes a ratio of combined channel signals to noise power, and K denotes a number of total channels.

5. The method as claimed in claim 4, further comprising a step of allocating transmit power to each of the M transmit antennas by distributing the transmit power ($P_k$) allocated according to each spreading code to the M transmit antennas.

6. The method as claimed in claim 5, wherein transmit power ($P_{k,m}$) for each of the M transmit antennas is allocated by means of equation $$P_{k,m} = \frac{1}{M}\left(\frac{1-\gamma}{1-\gamma^K}P_T\right)\gamma^{k-1}, \quad k = 1, 2, \cdots, K, \quad m = 1, 2, \cdots, M,$$

wherein M denotes the number of total transmit antennas, k denotes an index designating a spreading code, and m denotes an index designating a transmit antenna.

7. The method as claimed in claim 5, wherein the step dividing transmit power ($P_{k_0}$) for a predetermined channel ($k_0$) from among K channels into transmit power of each of M antennas comprises the steps of:

1) setting $k_0$ to K;
2) determining by means of $(Y_{k_0,k_0})^+$ after a predetermined index i is set to '1';
3) calculating $\tilde{\beta}_{k_0,g(i)}$ and for $\tilde{\eta}_{k_0,g(i)}$ for a g(i)th substream of $k_0$ by equation $$g(i) = \arg\min_{j \notin \{g(1),\ldots,g(i-1)\}} \left(G_{k_0}(i)\left(\sum_{k=k_0+1}^{K} R_{k_0,k}^{MCI} + R_{k_0}^{noise}\right)(G_{k_0}(i))^H\right)_{j,j}$$

$$w_{k_0,g(i)} = [G_{k_0}(i)]_{g(i)}$$

$$\tilde{\beta}_{k_0,g(i)} = w_{k_0,g(i)}\left(\sum_{k=k_0+1}^{K} R_{k_0,k}^{MCI}\right)w_{k_0,g(i)}^H$$

$$\tilde{\eta}_{k_0,g(i)} = w_{k_0,g(i)} R_{k_0}^{noise} w_{k_0,g(i)}^H$$

4) determining transmit power of a channel $k_0$ in a g(i)th antenna by equation $$P_{k_0,m} = (\tilde{\beta}_{k_0,m} + \tilde{\eta}_{k_0,m})\frac{P_{k_0}}{\sum_{m=1}^{M}(\tilde{\beta}_{k_0,m} + \tilde{\eta}_{k_0,m})},$$

$$k_0 = 1, 2, \cdots, K, m = 1, 2, \cdots, M$$

wherein, i is increased by '1', $G_{k_0}$ where $(<Y_{k_0,k_0}>_{\overline{g(i)}})^+$ where $<\cdot>_{\overline{g(i)}}$ is a deflated version of a matrix in which columns g(1), g(2), ..., g(i) have been zeroed, and then a process for determining transmit power by means of steps 3) and 4) is repeated until i reaches M, $(\cdot)^+$ denotes Moore-Penrose pseudo-inverse of a matrix, $<\cdot>_{\overline{g(i)}}$ denotes the g(i)th column of a matrix, and $Y_{k_0,k_0}$ denotes a space-time code correlation matrix of $k_0$ channel among the K channels.

8. A method for allocating transmit power in a multi-code multiple antenna system including M transmit antennas and N receive antennas, the method employing spreading codes to distinguish K total channels, the method comprising the steps of:

determining a power ratio ($\gamma$) such that, from among the K channels through which the M transmit antennas transmit, a signal-to-noise ratio of each channel has been measured, and a higher power is allocated to a channel with a higher signal-to-noise ratio than to a channel with a lower signal-to-noise-ratio, wherein the determination of the power ratio ($\gamma$) is made utilizing a ratio of power $$\left(\frac{\beta}{\eta}\right)$$

of combined channel signals to noise power;

dividing a total transmit power ($P_T$) into transmit power corresponding to each of the K channels using the power ratio ($\gamma$); and distributing the transmit power divided according to the K channels to each of the M antennas, wherein the power ratio ($\gamma$) is determined by $$\gamma = 1 \Big/ \left(+P_T\frac{\beta}{\eta}\right)^{1/K},$$

wherein $P_T$ denotes total given transmit power, $$\frac{\beta}{\eta}$$

denotes a ratio of the combined channel signals to the noise power, and K denotes a number of total channels.

9. The method as claimed in claim 8, wherein transmit power for each of the K channels is distributed according to equation $$P_k = \left(\frac{1-\gamma}{1-\gamma^K}P_T\right)\gamma^{k-1}, k = 1, 2, \cdots, K.$$

10. The method as claimed in claim 8, wherein transmit power ($P_{k,m}$) for each of the M transmit antennas is allocated by means of equation $$P_{k,m} = \frac{1}{M}\left(\frac{1-\gamma}{1-\gamma^K}P_T\right)\gamma^{k-1}, k = 1, 2, \cdots, K, m = 1, 2, \cdots, M,$$

wherein M denotes a number of total antennas, k denotes an index designating a spreading code, and m denotes an index designating a transmit antenna.

11. The method as claimed in claim 8, wherein the step dividing transmit power ($P_{k_0}$) for a predetermined channel ($k_0$) from among K channels into transmit power of each of M antennas comprises the steps of:

1) setting $k_0$ to K;

2) determining $G_{k_0}$ by means of $(Y_{k_0,k_0})^+$ after a predetermined index i is set to '1';

3) calculating $\tilde{\beta}_{k_0,g(i)}$ and $\tilde{\eta}_{k_0,g(i)}$ for a g(i)th substream of $k_0$ by equation $$g(i) = \underset{j \notin \{g(1),\ldots,g(i-1)\}}{\arg\min} \left( G_{k_0}(i) \left( \sum_{k=k_0+1}^{K} R_{k_0,k}^{MCI} + R_{k_0}^{noise} \right) (G_{k_0}(i))^H \right)_{j,j}$$

$$w_{k_0,g(i)} = [G_{k_0}(i)]_{g(i)}$$

$$\tilde{\beta}_{k_0,g(i)} = w_{k_0,g(i)} \left( \sum_{k=k_0+1}^{K} R_{k_0,k}^{MCI} \right) w_{k_0,g(i)}^H$$

$$\tilde{\eta}_{k_0,g(i)} = w_{k_0,g(i)} R_{k_0}^{noise} w_{k_0,g(i)}^H$$

4) determining transmit power of a channel $k_0$ in a g(i)th antenna by equation $$P_{k_0,m} = (\tilde{\beta}_{k_0,m} + \tilde{\eta}_{k_0,m}) \frac{P_{k_0}}{\sum_{m=1}^{M} (\tilde{\beta}_{k_0,m} + \tilde{\eta}_{k_0,m})},$$

$$k_0 = 1, 2, \cdots, K, m = 1, 2, \cdots, M$$

wherein, i is increased by '1', $G_{k_0}$ becomes $(<Y_{k_0,k_0}>_{\overline{g(i)}})^+$ where $<\cdot>_{\overline{g(i)}}$ is the deflated version of a matrix in which columns $g(1), g(2), \ldots, g(i)$ have been zeroed, and then a process for determining transmit power by means of steps 3) and 4) is repeated until i reaches M, $(\cdot)^+$ denotes Moore-Penrose pseudo-inverse of a matrix, $<\cdot>_{\overline{g(i)}}$ denotes the g(i)th column of a matrix, and $Y_{k0,k0}$ denotes a space-time code correlation matrix of $k_0$ channel among the K channels.

* * * * *